United States Patent
Todd et al.

(10) Patent No.: US 6,422,314 B1
(45) Date of Patent: Jul. 23, 2002

(54) WELL DRILLING AND SERVICING FLUIDS AND METHODS OF REMOVING FILTER CAKE DEPOSITED THEREBY

(75) Inventors: Bradley L. Todd; B. Raghava Reddy, both of Duncan, OK (US); James V. Fisk, Jr.; James D. Kercheville, both of Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 3 days.

(21) Appl. No.: 09/629,959

(22) Filed: Aug. 1, 2000

(51) Int. Cl.$^7$ ................................................ E21B 37/06
(52) U.S. Cl. ........................ 166/312; 166/300; 175/72; 507/140; 507/145; 507/269; 507/277
(58) Field of Search ................................ 166/300, 311, 166/312, 282, 283; 175/72; 507/269, 277, 271, 145, 140, 239, 129

(56) References Cited

U.S. PATENT DOCUMENTS 5,238,065 A    8/1993  Mondshine et al. ........ 166/300
5,783,527 A *  7/1998  Dobson, Jr. et al. ........ 507/269
6,143,698 A * 11/2000  Murphey et al. ........... 507/145

FOREIGN PATENT DOCUMENTS

EP          0672740 A1    9/1995

* cited by examiner

Primary Examiner—David Bagnell
Assistant Examiner—Zakiya Walker
(74) Attorney, Agent, or Firm—Robert A. Kent; C. Clark Dougherty, Jr.

(57) ABSTRACT

Well drilling and servicing fluids for use in producing formations and methods of removing filter cake therefrom are provided. The methods basically comprise using a drilling or servicing fluid comprised of water, a density increasing water soluble salt, a fluid loss control agent, a hydratable polymer solid suspending agent and a particulate solid bridging agent which is soluble in an aqueous ammonium salt solution. Thereafter, the filter cake deposited by the drilling or servicing fluid is contacted with a clean-up solution comprised of water and an ammonium salt for a period of time such that the bridging agent is dissolved thereby.

23 Claims, No Drawings

WELL DRILLING AND SERVICING FLUIDS AND METHODS OF REMOVING FILTER CAKE DEPOSITED THEREBY

BACKGROUND OF THE INVENTION

1. Field of the Invention

The present invention relates to well drilling and servicing fluids utilized in producing formations and the removal of filter cake deposited by the fluids in the formations.

2. Description of the Prior Art

The use of special fluids for drilling or servicing hydrocarbon producing formations penetrated by well bores is well known. The drilling fluids are utilized when well bores are drilled into producing formations to minimize damage to the permeability of the formations and their ability to produce hydrocarbons. Servicing fluids are utilized when completion operations are conducted in producing formations and when conducting work-over operations in the formations. The drilling and servicing fluids deposit filter cake on the walls of the well bores within the producing formations which prevents the drilling and servicing fluids from being lost into the formations and prevents solids from entering the porosities of the producing formations. After the drilling or servicing of a producing formation has been completed, the filter cake is removed prior to placing the formation on production.

The removal of the filter cake has heretofore been accomplished by including a particulate solid bridging agent in the drilling or servicing fluid for bridging over the formation pores which is acid soluble. The filter cake formed by the drilling or servicing fluid which includes the bridging agent and a polymeric suspending agent has been contacted with a strongly acidic solution, and the acidic solution has been allowed to remain in contact with the filter cake for a period of time sufficient to dissolve the bridging particles and polymer. In spite of efforts to avoid it, the strongly acidic solution has often corroded metallic surfaces and completion equipment such as sand screens which caused their early failure. The acidic solution may also be incompatible with the producing formation and cause damage thereto.

Water soluble particulate solid bridging agent has also been utilized in drilling or servicing fluids, and the filter cake containing the water soluble bridging agent has been contacted with an aqueous salt solution which is undersaturated with respect to the water soluble bridging particles. However, such undersaturated aqueous solutions require a relatively long period of time to dissolve the particles primarily due to the polymeric suspending agents included in the drilling or servicing fluids. That is, the polymer or polymers present in the filter cake shield the water soluble bridging particles from the aqueous solution.

In order to remove the polymeric materials in the filter cake and thereby allow the bridging agent in the filter cake to be dissolved by aqueous solutions, the filter cake has heretofore been contacted with an aqueous salt solution containing a peroxide such as alkaline earth metal peroxides, zinc peroxides and the like. An acid has also been included in the aqueous solution containing the metal peroxide to activate the peroxide. The aqueous solution has been maintained in contact with the filter cake for a period of time such that the polymers in the filter cake are decomposed and the bridging agent dissolved. Thereafter, the walls of the well bore are contacted with a wash solution to remove the remaining filter cake therefrom. Generally, the time required for the solution containing the metal peroxide and acid to break-up polymers and dissolve the bridging agent has been relatively long making the process expensive and subjecting metal tools and parts in contact with the solution to acid corrosion.

Thus, there are continuing needs for improved drilling and servicing fluids and methods of removing filter cake deposited by the fluids from producing formations.

SUMMARY OF THE INVENTION

The present invention provides improved well drilling and servicing fluids for use in producing formations which meet the needs described above and overcome the deficiencies of the prior art. The drilling and servicing fluids of this invention are basically comprised of water, a density increasing water soluble salt, a fluid loss control agent, a hydratable polymer solids suspending agent and a particulate solid bridging agent comprised of an inorganic compound which is dissolvable by a clean-up solution comprised of water and an ammonium salt. In a preferred embodiment, the inorganic bridging agent is magnesium oxide and the ammonium salt in the clean-up solution is ammonium chloride. A chelating agent such as citric acid and its salts is also preferably included in the clean-up solution. The well drilling and servicing fluid additionally can include a metal peroxide or other oxidizer or breaker which is activated by the ammonium salt in the clean-up solution and functions to oxidize and break-up polymer in the filter cake deposited by the fluid.

The present invention also provides methods of removing filter cake from the walls of well bores penetrating producing formations deposited therein by drilling or servicing fluids. The methods include utilizing, as the particulate solid bridging agent in the drilling or servicing fluid, an inorganic compound which is dissolvable in a clean-up solution comprised of water and an ammonium salt. The filter cake formed by the drilling or servicing fluid is contacted with the clean-up solution comprised of water and an ammonium salt for a period of time such that the bridging agent is dissolved thereby. In a preferred method, the bridging agent is magnesium oxide and the ammonium salt in the clean-up solution is ammonium chloride. The clean-up solution also preferably includes a chelating agent.

In addition to the bridging agent, the drilling or servicing fluid can also include an oxidizer or other breaker which is deposited in the filter cake and is activated by the ammonium chloride in the cleaning solution to break-up polymer in the filter cake.

It is, therefore, a general object of the present invention to provide improved well drilling and servicing fluids for use in producing formations and methods of removing filter cake therefrom.

Other and further objects, features and advantages of the present invention will be readily apparent to those skilled in the art upon a reading of the description of preferred embodiments which follows.

DESCRIPTION OF PREFERRED EMBODIMENT

The present invention provides improved well drilling and servicing fluids for use in producing formations which deposit filter cake that can be readily removed without the use of acids or other hazardous chemicals. The well drilling and servicing fluids of this invention are basically comprised of water, a density increasing water soluble salt, a fluid loss control agent, a hydratable polymer solids suspending agent and a particulate solid bridging agent which is soluble in a clean-up solution comprised of an aqueous ammonium salt solution. The density increasing water soluble salt can be one or more of sodium chloride, sodium bromide, sodium acetate, sodium formate, sodium citrate, potassium chloride, calcium chloride and calcium bromide. Common oilfield brines can be utilized and are preferred due to their ready availability in the oilfield.

A variety of fluid loss control agents can be utilized in the well drilling or servicing fluids of this invention, including, but not limited to, starch, starch ether derivatives, hydroxyethylcellulose, cross-linked hydroxyethylcellulose and mixtures thereof. Of these, starch is the most preferred. The fluid loss control agent is generally included in the salt solution or brine in an amount in the range of from about 0% to about 2% by weight of the salt solution or brine, more preferably in the range of from about 1% to about 1.3% and most preferably about 1.3%.

A variety of hydratable polymer solid suspending agents can be utilized, including, but not limited to, biopolymers such as xanthan and succinoglycon, cellulose derivatives such as hydroxyethylcellulose and guar and its derivatives such as hydroxypropyl guar. Of these, xanthan is preferred. The hydratable polymer is generally included in the drilling or servicing fluid in an amount in the range of from about 0% to about 0.6% by weight of the salt solution or brine, more preferably in the range of from about 0.13% to about 0.16% and most preferably about 0.13%.

In accordance with this invention, the particulate solid bridging agent is an inorganic compound that is substantially insoluble in water, but which is substantially soluble in aqueous ammonium salt clean-up solutions. Examples of such compounds include, but are not limited to, metal oxides, metal hydroxides, metal carbonates, metal sulfates, metal tungstates, metal fluorides, metal phosphates, metal peroxides, metal fluosilicates and the like. Examples of suitable metal oxides which can be used include, but are not limited to, magnesium oxide, manganese oxide, calcium oxide, lanthanum oxide, cupric oxide and zinc oxide. Of these, magnesium oxide is preferred. The bridging agent utilized in the drilling or servicing fluid is generally included therein in the amount of from about 5% to about 60% by weight of the aqueous salt solution or brine, more preferably in the range of from about 10% to about 27% and most preferably about 14%.

As will be understood by those skilled in the art, the particulate solid bridging agent is deposited by the drilling or servicing fluid on the walls of the well bore in the producing zone being drilled or serviced along with other solid particles and gelled suspending agent polymer. Upon completion of the drilling or servicing operation, a clean-up solution comprised of water and an ammonium salt is introduced into the well bore whereby the particulate solid bridging agent in the filter cake is dissolved.

In addition to the bridging agent, the drilling or servicing fluid can also contain an oxidizer or other breaker which is activated by the ammonium salt in the clean-up solution and functions to oxidize and break up gelled polymeric suspending agents and fluid loss control additives in the filter cake. The breaking up of the polymeric materials allows the particulate solid bridging agent to be dissolved by the clean-up solution in a shorter period of time. Generally, any oxidizer or other breaker that can be deposited with the filter cake and is substantially inactive until contacted with an aqueous ammonium salt solution can be utilized. For example, oxidizers that are substantially insoluble in water but are soluble in an aqueous ammonium salt solution can be utilized. Oxidizers or other breakers that can be encapsulated with a material that is insoluble in water but soluble in aqueous ammonium salt solutions can also be used.

Various unencapsulated oxidizers and breakers that can be utilized in accordance with this invention include, but are not limited to, magnesium peroxide, magnesium peroxydiphosphate, strontium peroxide, barium peroxide, calcium peroxide, magnesium perborate, barium bromate and mixtures thereof. Of these, magnesium peroxide is preferred. The oxidizer or breaker utilized is generally included in the drilling or servicing fluid in an amount in the range of from about 0.1% to about 6% by weight of the aqueous salt solution or brine, more preferably in the range of from about 0.3% to about 3% and most preferably about 0.3%.

The ammonium salt utilized in the clean-up solution can be one or more ammonium salts having the following formula:

$$R_nNH_{4-n}X$$

wherein R is an alkyl group having from 1 to 6 carbon atoms, n is an integer from 0 to 3 and X is an anionic radical selected from halogens, nitrate, citrate, acetate, sulfate, phosphate and hydrogen sulfate.

Examples of suitable such ammonium salts include, but are not limited to, ammonium chloride, ammonium bromide, ammonium nitrate, ammonium citrate, ammonium acetate and mixtures thereof. Of these, ammonium chloride is preferred. The ammonium salt utilized is generally included in the clean-up solution in an amount in the range of from about 3% to about 25% by weight of water therein, more preferably in the range of from about 5% to about 14% and most preferably about 5%.

The clean-up solution also preferably includes a chelating agent to facilitate the dissolution of the bridging agent in the clean-up solution. The term "chelating agent" is used herein to mean a chemical that will form a water-soluble complex with the cationic portion of the bridging agent to be dissolved. Various chelating agents can be utilized including, but not limited to, ethylenediaminetetraacetic acid (EDTA) and salts thereof, diaminocyclohexanetetraacetic acid and salts thereof, nitrilotriacetic acid (NTA) and salts thereof, citric acid and salts thereof, diglycolic acid and salts thereof, phosphonic acid and salts thereof, aspartic acid and its polymers and mixtures thereof. Of these, citric acid is preferred. The chelating agent utilized is generally included in the clean-up solution in an amount in the range of from about 0.1% to about 40% by weight of the solution, more preferably in the range of from about 5% to about 20% and most preferably about 20%. The clean-up solution can also optionally include one or more of the oxidizers or other breakers described above for oxidizing and breaking up polymeric materials in the filter cake.

As mentioned above, after the drilling or servicing of a producing formation has been completed, the clean-up solution is introduced into the producing formation into contact with the filter cake deposited therein. The clean-up solution is allowed to remain in contact with the filter cake for a period of time sufficient for gelled polymer in the filter cake to be broken up and the bridging agent to be dissolved. Thereafter, the formation can be produced to remove the remaining filter cake.

If necessary, a suitable wash solution can be circulated through the well bore in the producing formation to wash remaining filter cake from the walls of the well bore. Generally, the wash solution utilized should be an aqueous solution which does not adversely affect the permeability of the hydrocarbon containing producing formation. Thus, the cleaning solution can be an aqueous solution containing one or more salts which inhibit the swelling and/or dispersion of particles within the formation such as potassium chloride, sodium chloride, ammonium chloride and tetramethyl ammonium chloride. Of the above salts, ammonium chloride is preferred.

As will also be understood, the ammonium salt or mixtures of ammonium salts utilized in the clean-up solution can be delivered in solution as described above or the ammonium salt or salts can be encapsulated to delay the dissolution of the bridging solids until the clean-up of the filter cake is desired. Another similar technique for delivering the ammonium salt is to generate it in-situ, e.g., reacting urea with urease to form ammonium carbonate. When a chelating agent or mixture of chelating agents are used, the agent or agents can be delivered in solution, or encapsulated or generated in-situ.

A delayed break of the filter cake can also be achieved by utilizing a chelating agent that does not dissolve the bridging agent particles out of the presence of the ammonium salt or salts. The chelating agent can be included in the drilling or servicing fluid and the ammonium salt utilized can be delivered in encapsulated form or generated in-situ. Various other techniques known to those skilled in the art for providing delays can also be utilized such as delivering the chelating agent as an ester that slowly hydrolyzes to the acid chelating form, utilizing an ammonium salt that is not effective at a particular pH and introducing a second agent to change the pH to a level where the ammonium salt dissolves bridging particles, and other similar variations.

In accordance with the methods of this invention, filter cake is removed from the walls of a well bore penetrating a producing formation. The filter cake is deposited in the well bore by a drilling or servicing fluid of this invention comprised of water, a density increasing water soluble salt, a fluid loss control agent, a hydratable polymer solids suspending agent and a particulate solid bridging agent. The methods are basically comprised of the following steps. The particulate solid bridging agent utilized in the drilling or servicing fluid is an inorganic compound which dissolves in a clean-up solution comprised of water and an ammonium salt. After the drilling or servicing fluid is removed from the well bore, the filter cake remaining on the walls of the well bore including the bridging agent is contacted with a clean-up solution comprised of water and an ammonium salt for a period of time such that the bridging agent is dissolved thereby. As mentioned above, the drilling or servicing fluid also can include an oxidizer or other breaker which is deposited on the walls of the well bore in the filter cake. The oxidizer or other breaker is activated by the ammonium salt in the clean-up solution and oxidizes and breaks up gelled polymer in the filter cake. Also, as mentioned above, after the clean-up solution breaks up the gelled polymer in the filter cake and dissolves the bridging agent therein, a wash solution can be utilized to remove the remaining filter cake from the walls of the well bore or the remaining filter cake can be removed by producing the formation.

A particularly suitable method of this invention for removing filter cake from the walls of a well bore penetrating a producing formation deposited therein by a drilling or servicing fluid is comprised of the following steps. A drilling or servicing fluid is utilized comprised of water, a density increasing water soluble salt selected from the group consisting of sodium chloride, sodium bromide, potassium chloride, calcium chloride and mixtures thereof or one or more brines containing such salts, a fluid loss control agent comprised of starch, a hydratable polymer solid suspending agent comprised of xanthan, a particulate solid magnesium oxide bridging agent which is soluble in an aqueous ammonium salt solution and a particulate solid magnesium peroxide oxidizing agent which is activated by the ammonium salt to oxidize and break up gelled polymer in the filter cake. Thereafter, the filter cake produced by the drilling or servicing fluid is contacted with a clean-up solution comprised of water, ammonium chloride and a chelating agent such as citric acid for a time period such that gelled polymer in the filter cake is oxidized and broken up by the magnesium peroxide and the magnesium oxide bridging agent is dissolved by the clean-up solution. A wash solution can next be utilized to contact the walls of the well bore and wash away any remaining filter cake thereon or the remaining filter cake can be removed by producing the formation. As mentioned above, various components of the drilling or servicing fluid and/or the cleaning solution can be delivered to the producing formation in encapsulated form or generated in-situ, etc.

In order to further illustrate the drilling and servicing fluids and methods of this invention, the following examples are given.

EXAMPLE 1

Horizontal wells are often completed utilizing servicing fluids which include particulate solid bridging agents that are deposited as a part of the filter cake on the walls of the well bores. The wells are completed by placing gravel packs in the producing zones and clean-up solution is placed in the gravel packs and left to soak so that the filter cake is dissolved and removed. In a typical horizontal well completed with a gravel pack in an 8½" diameter well bore with 5½" diameter screens, the solubility of the bridging particles in the filter cake should be in the range of from about 1.5 to about 3 grams of filter cake per 100 cubic centimeters of clean-up solution.

A procedure for testing clean-up solutions for dissolving various particulate bridging agent was developed as follows: 1.5 grams of the particulate bridging agent tested are added to a 50 milliliter vial. The vial is then filled with clean-up solution, capped and placed in a 150° water bath for 24 hours. Thereafter, the solids in the vial are filtered using a preweighed filter. The filter with the solids thereon is dried and weighed to determine the weight of the undissolved solids. The solubility of the particulate bridging agent is then calculated in grams of bridging agent dissolved per 100 cubic centimeters of clean-up solution used.

A variety of particulate bridging agents and clean-up solutions were tested using the above described procedure, and the results of the testing are given in the Table below.

TABLE

Dissolution Of Particulate Solid Bridging Agents With Ammonium Salt Solutions

| Particulate Bridging Agent | Aqueous Ammonium Salt Clean-Up Solution | Solubility, grams per 100 cubic centimeter |
|---|---|---|
| Magnesium Oxide | 4 M Ammonium Chloride | 1.6 |
| Magnesium Oxide | 8 M Ammonium Acetate | 2.8 |
| Magnesium Oxide | 1.3 M Ammonium Chloride plus 1 M Sodium Citrate | 2.8 |
| Magnesium Carbonate | 8 M Ammonium Acetate | 2.2 |
| Magnesium Carbonate | 4 M Ammonium Chloride plus 0.4 M Trisodium Salt of Nitrilotriacetic Acid (NTA) | 2.9 |

TABLE-continued

Dissolution Of Particulate Solid
Bridging Agents With Ammonium Salt Solutions

| Particulate Bridging Agent | Aqueous Ammonium Salt Clean-Up Solution | Solubility, grams per 100 cubic centimeter |
|---|---|---|
| Anhydrite (CaSO$_4$) | 4 M Ammonium Chloride | 1.7 |
| Anhydrite (CaSO$_4$) | 8 M Ammonium Acetate | 2.9 |
| Lime (CaOH) | 1.3 M Ammonium Chloride | 3 |
| Zinc Oxide | 4 M Ammonium Chloride | 3 |
| Zinc Oxide | 1.3 M Ammonium Chloride plus 0.8 M Sodium Citrate | 2.9 |
| Zinc Carbonate | 4 M Ammonium Chloride | 2.4 |
| Lanthanum Oxide | 0.36 M Diammonium Salt of Ethylenediaminetetraacetic Acid (EDTA) | 2.2 |
| Manganese Hydroxide | 4 M Ammonium Chloride | 1.5 |

From the test results set forth in the Table, it can be seen that ammonium salt clean-up solutions of this invention are effective in dissolving a variety of inorganic bridging agent particles.

EXAMPLE 2

A drilling or servicing fluid was prepared comprised of 350 milliliters of water containing 3% potassium chloride by weight of water, 4 grams of starch fluid loss control additive, 2 grams of xanthan polymer suspending agent and 3 grams of particulate solid magnesium oxide bridging agent. The fluid was placed in two fluid loss cells wherein it was heated to 150° F. and pressured to 500 psi with nitrogen. The total filtrate loss in 30 minutes from the cells through porous media containing 10 micron pores was 26 milliliters. The fluid was then poured off leaving filter cake produced by the fluid on the porous media. To one cell a 3% by weight calcium chloride brine was added as a control. To the second cell a 7% ammonium chloride solution was added. The cells were heated to 150° F., pressured to 500 psi and allowed to remain static for 8 hours after which the filtrate rate was measured. The cell containing the 3% potassium chloride brine had a filtrate loss rate of 0.4 milliliters per minute. The cell containing the ammonium chloride solution had a filtrate loss rate of 428 milliliters per minute.

The foregoing tests clearly show that an aqueous ammonium chloride clean-up solution effectively removes filter cake containing magnesium oxide bridging agent.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of removing filter cake from the walls of a well bore penetrating a producing formation deposited therein by a drilling or servicing fluid comprised of water, a density increasing water soluble salt and a particulate solid bridging agent comprising the steps of:
    (a) utilizing as the particulate solid bridging agent in said drilling or servicing fluid an inorganic compound which is dissolvable in a-clean-up solution comprised of water and an ammonium salt; and
    (b) contacting said filter cake with a clean-up solution comprised of water and an ammonium salt for a period of time such that said bridging agent is dissolved thereby.

2. The method of claim 1 wherein said bridging agent is selected from the group consisting of magnesium oxide, manganese oxide, calcium oxide, lanthanum oxide, cupric oxide and zinc oxide.

3. The method of claim 1 wherein said bridging agent is magnesium oxide.

4. The method of claim 1 wherein said density increasing water soluble salt in said drilling or servicing fluid is selected from the group consisting of sodium chloride, sodium bromide, sodium acetate, sodium formate, sodium citrate, potassium chloride, calcium chloride, calcium bromide and mixtures thereof.

5. The method of claim 1 wherein said ammonium salt in said clean-up solution has the formula $$R_nNH_{4-n}X$$

wherein R is an alkyl radical having from 1 to 6 carbon atoms, n is an integer from 0 to 3 and X is an anionic radical selected from halogens, nitrate, citrate, acetate, sulfate, phosphate and hydrogen sulfate.

6. The method of claim 1 wherein said ammonium salt in said clean-up solution is selected from the group consisting of ammonium chloride, ammonium bromide, ammonium nitrate, ammonium citrate, ammonium acetate and mixtures thereof.

7. The method of claim 1 wherein said ammonium salt in said clean-up solution is ammonium chloride.

8. The method of claim 1 wherein said drilling or servicing fluid further comprises a fluid loss control agent.

9. The method of claim 8 wherein said fluid loss control agent in said drilling or servicing fluid is selected from the group consisting of starch, starch ether derivatives, hydroxyethylcellulose, cross-linked hydroxyethylcellulose and mixtures thereof.

10. The method of claim 1 wherein said drilling or servicing fluid further comprises a hydratable polymer solids suspending agent.

11. The method of claim 10 wherein said hydratable polymer solids suspending agent is selected from the group consisting of xanthan, succinoglycon, cellulose derivatives, guar, guar derivatives and mixtures thereof.

12. The method of claim 10 wherein said drilling or servicing fluid further comprises an oxidizer or other breaker which is activated by said ammonium salt in said clean-up solution to oxidize and break-up polymer in said filter cake deposited by said fluid.

13. The method of claim 12 wherein said oxidizer or other breaker is selected from the group consisting of magnesium peroxide, magnesium peroxydiphosphate, strontium peroxide, barium peroxide, calcium peroxide, magnesium perborate, barium bromate and mixtures thereof.

14. The method of claim 12 wherein said oxidizer or other breaker is magnesium peroxide.

15. A method of removing filter cake from the walls of a well bore penetrating a producing formation deposited therein by a drilling or servicing fluid comprising the steps of:
    (a) using as the drilling or servicing fluid, a fluid comprised of water, a density increasing water soluble salt selected from the group consisting of sodium chloride, sodium bromide, potassium chloride, calcium chloride, calcium bromide and mixtures thereof, a fluid loss control agent comprised of starch, a hydratable polymer solids suspending agent comprised of xanthan and a particulate solid metal oxide bridging agent which is soluble in an aqueous ammonium salt solution; and
    (b) contacting said filter cake with a clean-up solution comprised of water and an ammonium salt for a period of time such that said metal oxide bridging agent is dissolved thereby.

16. The method of claim 15 wherein said metal oxide bridging agent is selected from the group consisting of magnesium oxide, manganese oxide, calcium oxide, lanthanum oxide, cupric oxide and zinc oxide.

17. The method of claim 15 wherein said metal oxide bridging agent is magnesium oxide.

18. The method of claim 15 wherein said drilling or servicing fluid further comprises an oxidizer or other breaker which is activated by said ammonium salt in said clean-up solution to oxidize and break-up polymer in the filter cake deposited by said fluid.

19. The method of claim 18 wherein said oxidizer or other breaker is selected from the group consisting of magnesium peroxide, magnesium peroxydiphosphate, strontium peroxide, barium peroxide, calcium peroxide, magnesium perborate, barium bromate and mixtures thereof.

20. The method of claim 18 wherein said oxidizer or other breaker is magnesium peroxide.

21. The method of claim 15 wherein said ammonium salt in said clean-up solution has the formula $$R_nNH_{4-n}X$$

wherein R is an alkyl radical having from 1 to 6 carbon atoms, n is an integer from 0 to 3 and X is an anionic radical selected from halogens, nitrate, citrate, acetate, sulfate, phosphate and hydrogen sulfate.

22. The method of claim 15 wherein said ammonium salt in said clean-up solution is selected from the group consisting of ammonium chloride, ammonium bromide, ammonium nitrate, ammonium citrate, ammonium acetate and mixtures thereof.

23. The method of claim 15 wherein said ammonium salt in said clean-up solution is ammonium chloride.

* * * * *